Feb. 15, 1966  H. G. KEWLEY  3,235,118
FRAME STRUCTURES AND THE JOINING OF MEMBERS
Filed Jan. 22, 1963  3 Sheets-Sheet 1
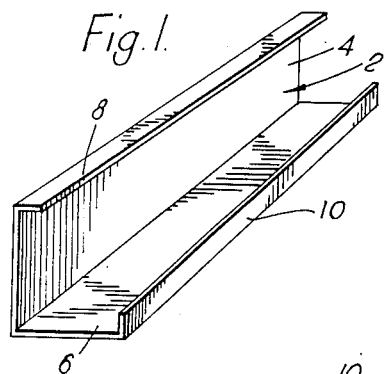
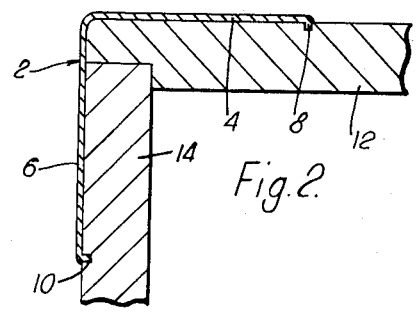
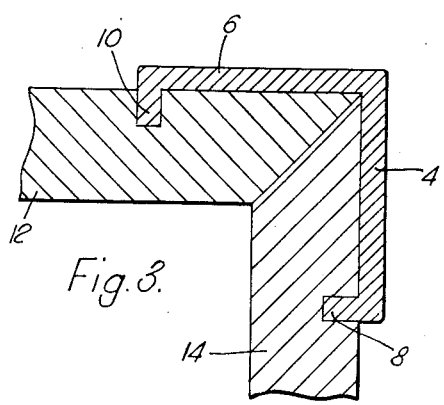
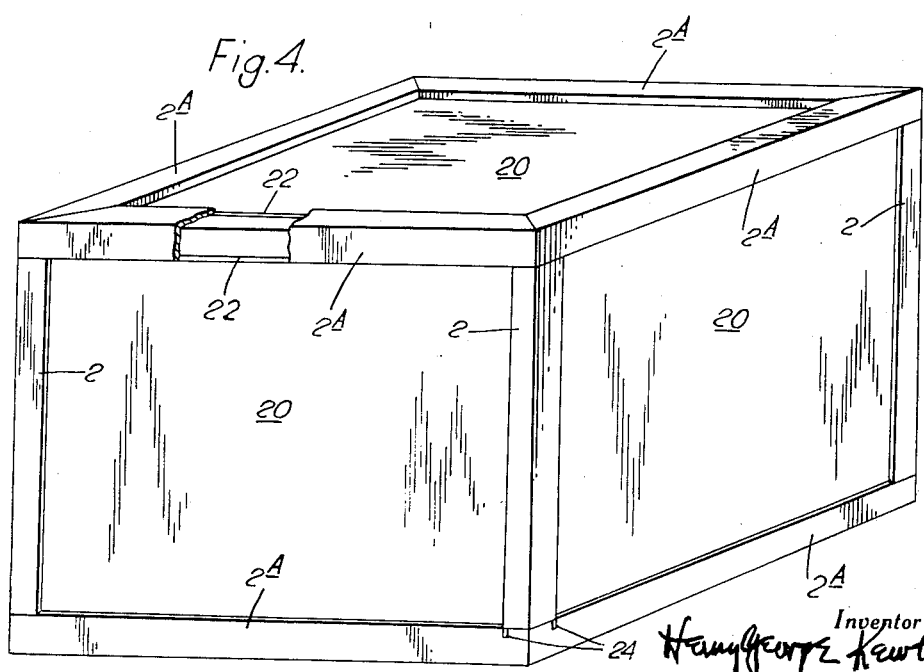

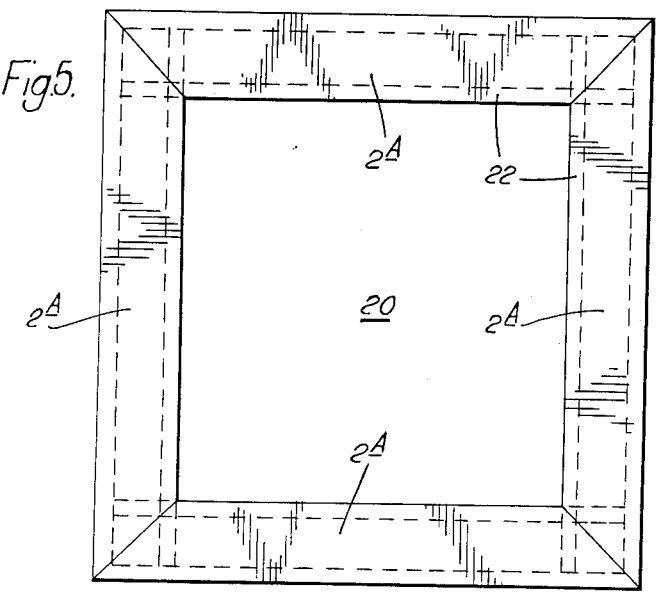
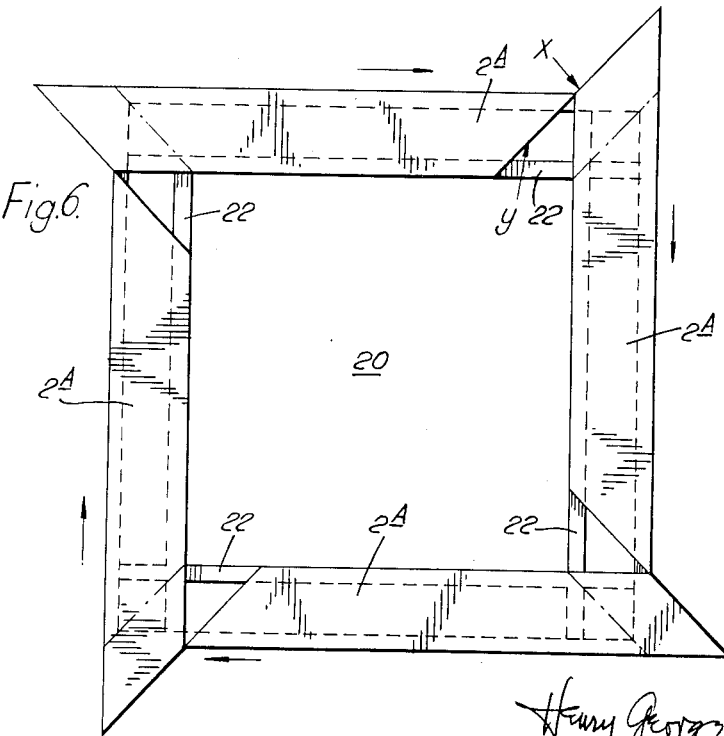

Feb. 15, 1966  H. G. KEWLEY  3,235,118
FRAME STRUCTURES AND THE JOINING OF MEMBERS
Filed Jan. 22, 1963  3 Sheets-Sheet 3
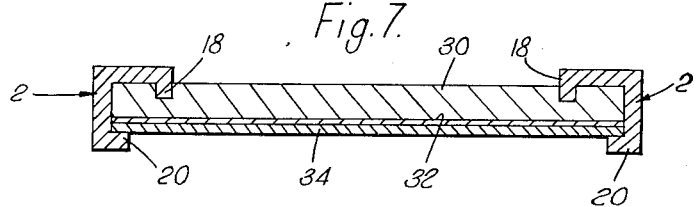
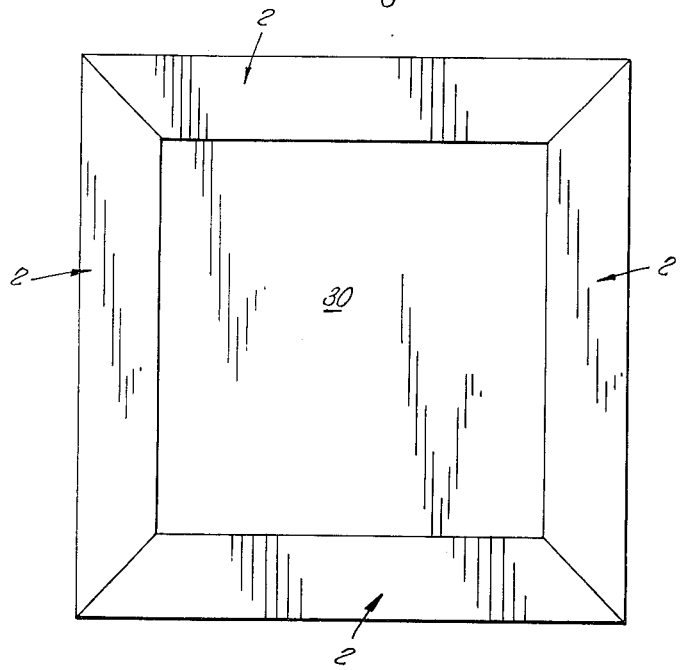

United States Patent Office 3,235,118
Patented Feb. 15, 1966

---

3,235,118
FRAME STRUCTURES AND THE JOINING OF MEMBERS
Henry George Kewley, Suttonbridge Farm, Rochford, Essex, England
Filed Jan. 22, 1963, Ser. No. 253,221
Claims priority, application Great Britain, Oct. 21, 1958, 33,571/58; Dec. 3, 1958, 38,970/58; June 9, 1959, 19,706/59
3 Claims. (Cl. 217—65)

This application is a continuation-in-part of my application Serial Number 847,763 filed Oct. 21, 1959 (now abandoned).

The invention is primarily concerned with methods of jointing by which boxes may be assembled and such things as pictures and table tops may be framed.

Several joints are known and have been used for many years, which can be used without fastening or adhesive, the best known is probably the dovetail joint. All suffer from the disadvantage of being relatively complex and expensive to produce, limited in the materials to which they can be applied and not well adapted to machine and mass production techniques. Jointing, framing and erection in accordance with the invention involve only the simplest of operations which can be readily carried out by generally available machinery and acceptable results can be obtained without calling for high precision.

The invention involves the use of a bracket, clip or rail of a special angle section. Each web of the angle carries a flange and in use the flanges are received in grooves or bear against the sides of rebates or on shoulders formed in or on the parts or part to be joined or otherwise used to engage surfaces which are at angle to one another.

Joints formed in this manner can conveniently be regarded as double tongue and groove joints.

The angle section can only be removed from a joint or frame in accordance with the invention by a relative longitudinal movement.

In many cases no special step will be required to restrain such movement and where restraint is needed the means can be very simple, for example a single nail or screw or even an ordinary ball catch.

The engagement of right angled flanges with surfaces normal to one another on abutting parts to be joined is of itself a restraint on relative lateral movement and only a single movement of one of the parts has to be prevented by other means, which in most cases need be no more elaborate than a simple rebating or mitering. Even this single lateral movement will be prevented by the engagement of flanges which are at an oblique angle to one another with similarly obliquely inclined surfaces on the parts to be joined.

Where the sections have inturned flanges they represent more than half of a closed figure and their successful use and versatility is in large part a consequence of this fact.

An object of the invention is to provide a method of assembling flat sided structures such as boxes or frames for pictures and the like employing such angle section strips or rails.

A further object is to provide a method of assembling four angle strips as described above each having mitred ends, in a rectangular arrangement with the flanges of the strips engaging in gooves in the parts to be joined so that these parts are held together with the ends of the strips abutting to form a closed rectangle.

The method of assembly of such a flat sided structure in accordance with the invention includes the steps of loosely assembling the angle strips with the flanges thereof engaging in the grooves on the parts to be assembled and then exerting a closing couple on two parallel strips, to slide the four strips simultaneously in the grooves around the edges of the parts until all the mitred ends of the strips are tightly engaged with each other and the parts held together by the strips.

Embodiments of the invention will now be described by way of example with reference to the accompanying drawings in which:

FIGURE 1 shows in isometric view one possible section of joining strip;

FIGURES 2 and 3 are horizontal sections illustrating joints formed by the strip shown in FIGURE 1;

FIGURE 4 is an isometric view of a box assembled by using rails of the section shown in FIGURE 1;

FIGURE 5 is a plan of the box shown in FIGURE 4;

FIGURE 6 is a plan view similar to that of FIGURE 5 but showing the manner in which the top and bottom strips are assembled together;

FIGURE 7 is a section illustrating the application of strips of the section shown in FIGURE 1 as a picture frame or similar article; and FIGURE 8 is a plan view corfresponding to FIGURE 7.

The various parts of the structures shown in FIGURES 4 to 8 are held together by means of retaining strips 2, such as that shown in FIGURE 1, which is of angle section and comprises webs 4, 6, at right angles to one another and each carrying relatively narrow inturned flanges 8, 10, at their outer edges.

Examples of joints formed with this strip are shown in FIGURES 2 and 3. The members 12, 14 being joined are both formed with a groove or slot adjacent their mating ends to receive the flanges 8, 10 of the strips 2. Instead of a groove the members 12, and 14 could have an alternative means of preventing longitudinal displacement of the members from the retaining strip. For example, each member could have a block secured to its outer surface over which the flanges of the retaining strip engage. One or both of the mating ends of the members 12, 14 are so shaped that relative lateral movement in the one direction permitted by the retaining strip 2 is prevented. In the example shown in FIGURE 2 the end of the member 12 is rebated to receive the end of the member 14. In the example shown in FIGURE 3 the two mating ends of the member 14 are mitred.

It will be appreciated that the joint formed is secure and that the members being joined are prevented from relative movement in any direction in the plane of the members. The joint can rapidly be made or unmade merely by sliding the retaining strip 2 over the ends of the members.

Such a joint is used to connect togehter all the identical six side panels 20 of the box shown in FIGURES 4 and 5. The four strips 2a, joining one pair of opposite panels to the edges of the adjacent four panels, have their end mitred. Due to the particular construction of the strips it is possible to assemble the four strips 2a to fasten the top and bottom panels (as shown in the drawings) by simultaneously sliding the four strips in the groove 22 scored in the panels to receive the flanges 8 and 10 of the strips. The side panels 20 (as shown in the drawings) are joined to one another by unmitred strips.

The method of assembling of the four mitred strips at the top and bottom of the box is illustrated in FIGURE 6 in which the strips or rails 2a are shown disjust in contact to show how the simultaneous movement is possible. It will be clear on considering the drawing that if all four rails are moved simultaneously in the direction of the arrows by the application of a closing couple on one pair of opposite rails or strips, the mitred edges will be in sliding contact with one another throughout the movement, one face say X receiving at just the same rate as the adjacent face Y advances. In many cases, particularly if the flanges of the strip fit closely in the grooves 22, it will be found easier to take advantage of the almost inevitable small play to move opposite pairs of rails alternately through small distances.

The lower rails 2a (as shown in the drawing) can be locked in position by cutting a notch in a flange where it abuts the flange on one of the side rails 2 and allowing the latter flange to protrude somewhat beyond the unmitred end of the side rail 2 as suggested in broken lines at 24 so that when the rails are in the position shown the protruding flange engages with the notch and effectively prevents all movement of the four lower rails 2a. The upper rails 2a can, if desired be locked by a single pin, a ball catch, or other conventional lock.

A box in accordance with the invention can very easily be assembled from its parts to form a closed container which cannot at all easily be opened by anyone who does not know the way in which the box was assembled.

The possibility of applying rails simultaneously as explained above in connection with a box, makes it possible to apply the rail section shown in FIGURE 1 very effectively to the framing of pictures, mirrors or the like or any other flat surface such as a table top or desk. It can in fact be applied to surfaces of any straight sided structure with four walls or sides. FIGURE 7 is a section of a picture frame showing such a use. The picture assembly comprises a backing board 30 grooved to receive the flanges 18 of rail sections 2 and of appropriate thickness to allow a picture 32 and a glass 34 to be retained between its surface and the other flanges 20 of the rails 2. The top and bottom plan views are as shown in FIGURE 8 and the same motion is required to apply or remove the four framing rails 2 as is illustrated in FIGURE 6 and which has been described above.

It will be appreciated that provided the parts to be held together have a thickness such that they extend substantially between the flanges of the retaining or joining strips or rails the invention can be used for the assembly of any type of frame. In each case the four framing rails have to be applied by the method described to assemble the parts together.

Any suitable material may be used for the panels and for the retaining strips and the invention extends not only to the method of assembling constructions but also to the structures when so assembled.

I claim:

1. In a method of assembling a flat-sided rectangular box having a top panel joined to four side panels by means of four horizontal retaining strips, the opposed pairs of strips and panels being of equal length, a bottom panel joined to the four side panels by means of four similar horizontal retaining strips, the vertical edges of the side panels being secured together by other vertical strips extending between the horizontal strips; each said horizontal strip being of angle section and having two webs with parallel outer edges formed with inturned flanges disposed at right angles along said outer edges, one flange of each strip being retained in a groove extending along the side of its related top and bottom panels and the other flange of each strip being retained in a groove extending along the corresponding edge of its related side panel, said horizontal strips having their abutting ends mitred at the corners of the top and bottom panels; the step of arranging in a single plane around the four edges of the top and bottom panels, loose assemblies of said four retaining strips respectively with their flanges engaged in a portion of the grooves and with the corresponding end of each strip projecting beyond a side of the box so that the outer tip of the mitred end of one strip engages the inner tip of the mitred end of an adjacent strip; and the step of exerting a closing couple on two parallel strips of the assemblies causing the four respective strips to simultaneously slide in the grooves around the four edges of the top and bottom panels until all portions of the mitred ends of the strips tightly engage each other at the corners of the top and bottom panels, whereby the top, bottom, and side panels will be assembled together to form a closed box.

2. In a method of assembling a rectangular frame around a picture or the like and a rectangular backing member therefor, said frame comprising four retaining strips, the opposed pairs of strips being of equal length, each strip being of angle section having two webs with parallel outer edges formed with inturned flanges disposed at right angles along said outer edges, one flange of each strip being retained in a groove extending along the side of the back face of said backing member, and the other flange of each strip engaging over the front face of said backing and picture; the abutting ends of the said strips at the corners of the backing member being mitred; the step of arranging in a single plane around the backing member a loose assembly of said four strips with their flanges engaged in a portion of the grooves and over the picture and with the corresponding end of each strip projecting beyond the side of the backing member so that the outer tip of the mitred end of one strip engages the inner tip of the mitred end of an adjacent strip; and the step of exerting a closing couple on two parallel strips of the assembly causing the four strips to simultaneously slide in the grooves around the four sides of the backing member until all portions of the mitred ends of the strips tightly engage each other at the corners of the backing member, whereby the parts will be held together with the strips lying along the sides of the rectangle.

3. A rectangular box comprising a top panel, a bottom panel, and four side panels; four horizontal retaining strips respectively securing the edges of the top and bottom panels to the top and bottom edges of the four side panels, respectively, one strip extending respectively along each side of the top and bottom panels; each strip being of angle section having two webs with parallel outer edges and formed with inturned flanges disposed at right angles along said outer edges; all of the panels having grooves adjacent and parallel to their four edges; one of the flanges of each horizontal strip being engaged in a groove in its related top and bottom panel and the other flange of each horizontal strip being engaged in a groove in its adjacent related side panel, the mating ends of said horizontal strips at the four corners of the top and bottom panels being mitred; four vertical strips respectively securing the vertical edges of the side panels together, said vertical strips being of similar cross-section to the horizontal strip and having their flanges engaged in the vertical grooves in adjacent side panels, and said vertical strips having squared-off ends abutting the horizontal strips respectively; said horizontal strips at the top and bottom panels being applied by first arranging a loose assembly of said horizontal retaining strips around the four edges of the top and bottom panels respectively with their flanges engaged in a portion of the grooves and with the corresponding end of each strip projecting beyond the side of the box so that the outer tip of the mitred end of one strip engages the inner tip of the mitred end of an adjacent strip, and then exerting a closing couple on two parallel strips of the assembly causing the four respective strips to slide simultaneously in the grooves around the four edges of the top and bottom panels until all portions of the mitred ends of the strips tightly engage each other at the corners of the panels.

References Cited by the Examiner

UNITED STATES PATENTS

| | | | |
|---|---|---|---|
| 378,601 | 2/1888 | Linderman | 217—65 |
| 529,057 | 11/1894 | Alexander | 217—69 |
| 1,088,493 | 2/1914 | Ward | 217—69 |
| 1,089,538 | 3/1914 | Davidson | 217—69 |
| 2,378,267 | 6/1945 | Waller | 217—69 |
| 2,616,197 | 11/1952 | Osburn | 40—152 |
| 2,777,232 | 1/1957 | Kulicke et al. | 40—155 |
| 2,829,792 | 4/1958 | Gill | 217—12 |
| 3,039,217 | 6/1962 | Stefanakis | 40—152 |

FOREIGN PATENTS

| | | |
|---|---|---|
| 1,045,146 | 6/1953 | France. |
| 14,744 | 18/1886 | Great Britain. |

THERON E. CONDON, *Primary Examiner.*

EARLE J. DRUMMOND, *Examiner.*